United States Patent [19]

Noguchi

[11] 4,429,220
[45] Jan. 31, 1984

[54] LIGHT BEAM SCANNING DEVICE WITH CURVED GRID PATTERN

[75] Inventor: Masaru Noguchi, Asaka, Japan

[73] Assignee: Fuji Photo Film Co., Ltd., Kanagawa, Japan

[21] Appl. No.: 259,623

[22] Filed: May 1, 1981

[30] Foreign Application Priority Data

May 14, 1980 [JP] Japan ............................. 55-63529

[51] Int. Cl.³ ............................................. H01J 3/14
[52] U.S. Cl. .................................. 250/236; 350/6.9; 250/237 G
[58] Field of Search ................ 250/216, 234, 235, 236, 250/230, 237 R, 237 G; 350/6.5–6.91; 358/293

[56] References Cited

U.S. PATENT DOCUMENTS 3,658,428  4/1972  Voigtlaender-Tetzner ........ 250/236
4,178,064  12/1979  Mrdjen ................................. 250/235
4,329,011  5/1982  Mori et al. ............................ 350/6.6

*Primary Examiner*—David C. Nelms
*Attorney, Agent, or Firm*—Sughrue, Mion, Zinn, Macpeak and Seas

[57] ABSTRACT

A light beam scanning device in which scanning speed irregularities of a light spot in a scanning plane are corrected using a signal which is generated in response to light passing through a grid pattern. First and second light beams are directed onto a scanning mirror, which may be an oscillating mirror or a rotary multi-surface mirror. The deflected first light beam is scanned on a recording surface while the deflected second light beam is directed through a grid pattern. An optical detector produces an output signal in response to light passing through the grid pattern which is used to control the movement of the beam deflecting device. Preferably, the grid pattern is curved to lie along a circle having the deflection point of the second light beam on the surface of the mirror as its center.

7 Claims, 5 Drawing Figures

LIGHT BEAM SCANNING DEVICE WITH CURVED GRID PATTERN

BACKGROUND OF THE INVENTION

The present invention relates to a light beam scanning device in which scanning speed irregularities of a light spot in a scanning plane are corrected.

A variety of light beam scanning devices have been proposed in the art which operate to record data on a recording material placed on its light spot scanning plane or to read data from an original placed thereon. Most of the conventional devices employ a vibrating mirror such as a galvanometer or a rotary multi-surface mirror as a light beam deflector. For such devices, it is desirable that the light spot scan the scanning plane at a constant speed. If the scanning speed is irregular, a recorded pattern or a pattern obtained by reproducing read signals will also be irregular. For instance, in the case where a galvanometer is employed as the light beam deflector, a scanning speed irregularity attributed to a combination of inaccuracies in the waveform of sawtooth wave drive signals, inaccuracies of response of the galvanometer and inaccuracies in the repetition rate can produce a considerably great irregularity in a recorded image. This irregularity increases as the scanning speed increases. In the case also where a rotary multi-surface mirror is employed as the light beam deflector, it is considerably difficult to rotate the mirror at a constant speed, and accordingly the light spot scanning speed is liable to be irregular.

A method of substantially correcting light spot scanning speed irregularities described above has been known in the art. In accordance with that technique, a grid pattern having transparent and opaque portions arranged alternately with a predetermined period in the direction of scanning is placed in a plane which is substantially equivalent to a scanning plane for recording or reading information. A photoelectric signal obtained through the grid pattern is used as a reference signal in the scanning operation.

Examples of a light beam scanning device for practicing the conventional methods are shown in FIGS. 1 and 2. In FIGS. 1 and 2, reference numeral 1 designates an optical deflector, 2 a scanning lens, 3 a scanning plane (surface) on which a recording material or an original is placed, 5 a grid pattern, 6 a condenser lens, 7 an optical detector, 8 a first laser beam (indicated by a solid line) adapted to scan the recording material or the original, and 9 a second laser beam (indicated by a broken line) adapted to scan the grid pattern.

In the example shown in FIG. 1, the first laser beam 8 and the second laser beam 9 are applied along substantially the same axis to the optical deflector 1. After being deflected by the optical deflector 1, the laser beams are applied through the scanning lens 2 to a beam separating mirror 4 whereby they are separated so that the first laser beam scans the scanning plane 3 on which the recording material or the original is placed while the second laser beam scans the grid pattern 5. In this case, the length of the grid pattern 5 in the scanning direction is equal to or more than the length of the recording material or the original in the scanning direction. For instance, in the case of a facsimile device or a printer, the length must be at least 210 mm (equal to the length of the short side of an A4 size sheet). Accordingly, in order to collect the laser beam and to direct it onto the optical detector 7 after the beam has passed through the grid pattern 5 and has been modulated thereby, the condenser lens 6 must have a considerably large diameter or a large bundle of optical fibers must be used. Although a Fresnel lens of large diameter is readily available, its light collecting characteristic is not sufficiently great. A bundle of optical fibers is expensive.

In the case of FIG. 2, the first laser beam 8 and the second laser beam 9 applied to the optical detector 7 form an angle, i.e., the laser beams 8 and 9 are applied to the optical detector 7 at different angles. More specifically, after being deflected by the optical deflector 1, the first laser beam 8 passes through the first scanning lens 2 and scans the scanning plane 3 on which the recording material of the original is placed. On the other hand, the second laser beam 9 falling on the rear surface of the optical deflector 1 is deflected thereby. The second laser beam 9 thus deflected passes through the second scanning lens 2' and scans the grid pattern 5.

If, in this case, the focal distance of the second scanning lens 2' is made shorter than that of the first scanning lens 2, the length of the grid pattern 5 in the scanning direction can be shorter than the length of the recording material or the original in the scanning direction. Accordingly it is then possible to use an ordinary glass lens as the condenser lens 6. However, this optical system is still disadvantageous in that, in order for the optical system to perform properly, the image forming characteristics of two scanning lenses 2 and 2' should be the same. Thus, since it is desirable that the lenses be f$\theta$ lenses, the manufacturing cost of the optical system increases.

As is apparent from the above description, the conventional method of correcting the scanning speed irregularity of a light spot in a scanning plane suffers from drawbacks in that the performance is insufficient and the manufacturing cost of a device for practicing the method is high.

Accordingly, an object of the invention is to provide a light beam scanning device in which all of the above-described difficulties accompanying a conventional method have been eliminated and the scanning speed irregularities of a light spot in a scanning plane are corrected, which has a high performance, and low manufacturing cost.

SUMMARY OF THE INVENTION

Provided according to the invention is a light beam scanning device in which the scanning speed irregularities of a light spot in a scanning plane are corrected using a signal which is generated from a grid pattern which has transparent portions and opaque portions alternately arranged in the direction of deflection of a light beam with the pattern being positioned in a deflection plane along a circumference whose center coincides with a deflection point.

DESCRIPTION OF THE PREFERRED EMBODIMENTS

Figure 1:
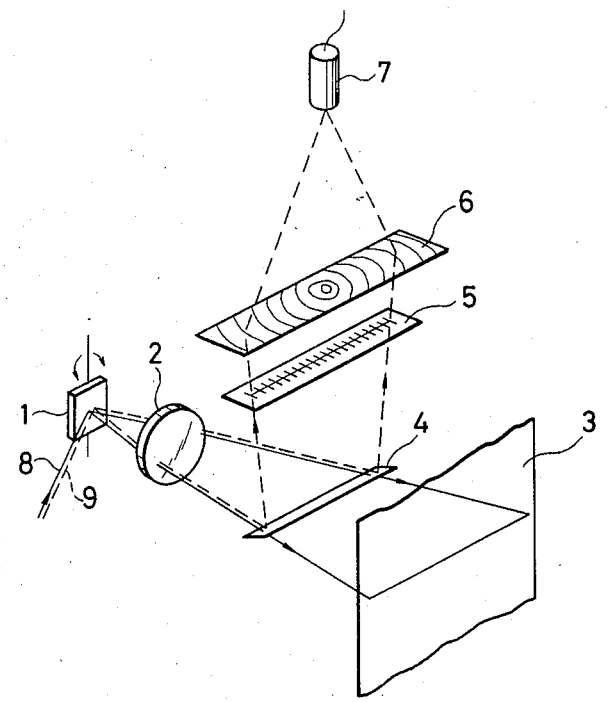
FIGS. 1 and 2 are schematic explanatory diagrams showing examples of conventional light beam scanning devices.
Figure 2:
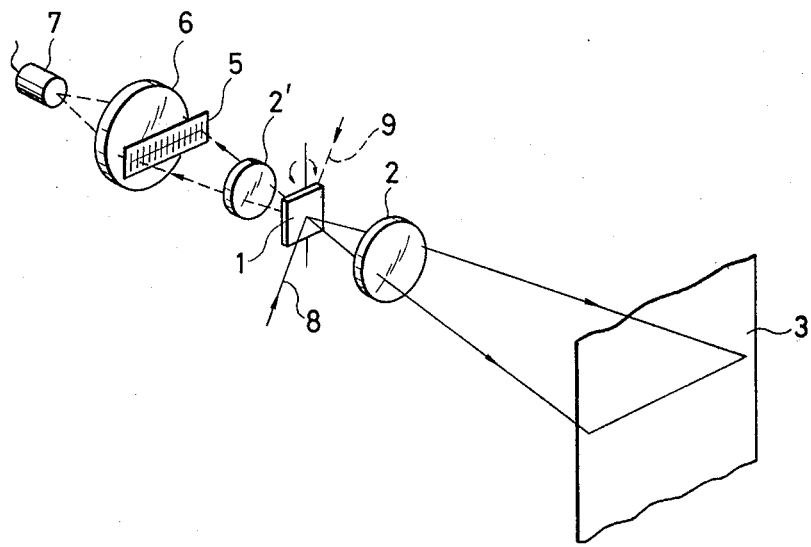
Figure 3:
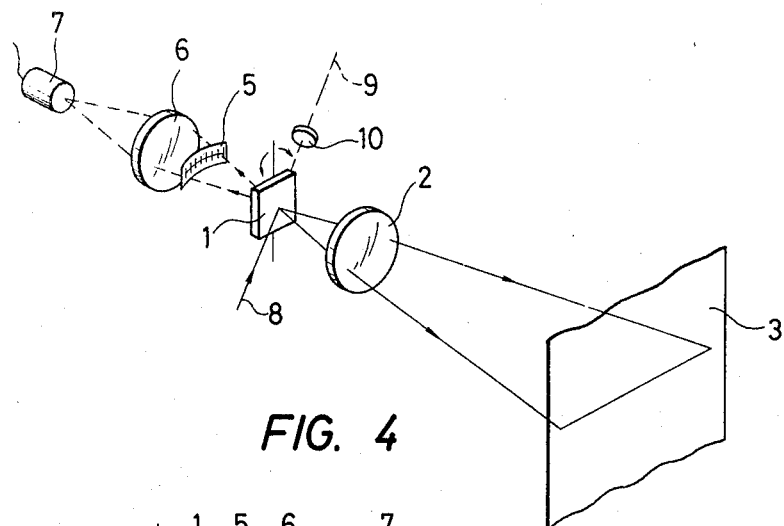
FIGS. 3 and 4 are schematic explanatory diagrams showing preferred embodiments of a light beam scanning device according to the invention.

FIG. 3 shows a perspective view of a first preferred embodiment of a light beam scanning device according to the invention. As shown in FIG. 3, a first laser beam 8, after being deflected by an oscillating mirror 1, passes through a scanning lens 2 to scan a scanning surface 3 on which a recording material or an original is placed. A second laser beam 9 falls on the rear surface of the oscillating mirror 1 through a focusing lens 10. As a result, the second laser beam 9 scans a grid pattern 5 which is arranged on a deflection plane along a circumference with the beam deflection point as its center. The focusing lens 10 acts to focus the laser beam 9 on the grid pattern 5. The laser beam is modulated by the grid pattern 5 and is then collected on an optical detector 7 by a condenser lens 6 in response to which a photoelectric signal is outputted by the optical detector 7. The photoelectric signal thus outputted is utilized for the timing of the scanning operation using well-known techniques. If an fθ lens is employed for the scanning lens 2, the grid pattern 5 should be so designed that transparent portions and opaque portions are provided alternately at predetermined intervals.

Figure 4:
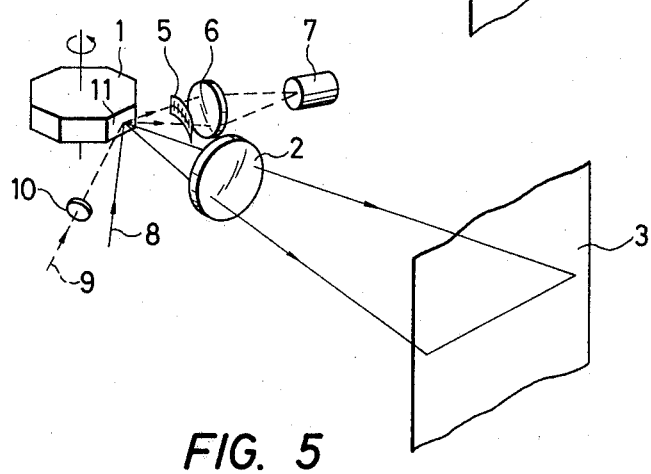

FIG. 4 shows a second preferred embodiment of a light beam scanning device according to the invention. A first laser beam 8, after being deflected by the reflecting surfaces 11 of a rotary multi-surface mirror 1, passes through a scanning lens 2 to scan a scanning plane 3 on which a recording material or an original is placed. After passing through a focusing lens 10, a second laser beam 9 is deflected by the reflecting surfaces 11 of a rotary multi-surface mirror 1 to scan a grid pattern 5 which is arranged in a deflection plane along a circumference with the beam deflection point as its center. The focusing lens 10 acts to focus the laser beam 9 on the grid pattern 5. The laser beam is modulated by the grid pattern 5 and is then directed onto an optical detector 7 by a condenser lens 6 and a photoelectric signal is accordingly outputted by the optical detector 7. The photoelectric signal thus outputted is utilized for the timing of the scanning operation. Similarly, if an fθ lens is employed as the scanning lens 2, the grid pattern 5 should be so designed that transparent portions and opaque portions are provided alternately at predetermined intervals.

Figure 5:
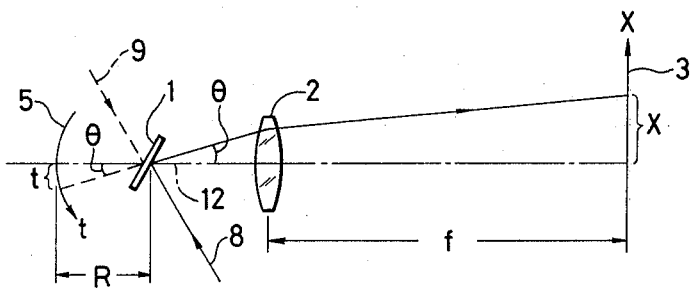
FIG. 5 is a diagram for a description of the principles of operation of a light beam scanning device of the invention.

The relationship between the scanning spots of the laser beams on the scanning plane 3 and the grid pattern 5 in each of the above-described two embodiments of the light beam scanning device of the invention will now be discussed. Since the two embodiments are operationally similar, only the first embodiment relating to the device shown in FIG. 3 will be described. FIG. 5 is a plan view of a part of the first embodiment. When the oscillating mirror 1 has been deflected through an angle of θ/2 from the deflection center, each of the first and second laser beams 8 and 9 is deflected through an angle θ from its reference direction 12. The reference direction 12 coincides with the optical axis of the scanning lens 2 and with the central axis of the grid pattern 5. If an fθ lens having a focal length f is used as the scanning lens 2, the spot position x of the deflected first laser beam on the scanning plane 3 can be represented by the following expression (1):

$$x = f \cdot \theta. \tag{1}$$

On the other hand, the spot position t of the deflected second laser beam on the grid pattern 5 can be represented by the following expression (2):

$$t = R \cdot \theta, \tag{2}$$

where R is the radius of curvature of the grid pattern.

The center of the radius of curvature coincides with the deflection center (on the rear surface of the oscillating mirror 1) of the second laser beam. The spot position t moves along the grid pattern 5.

From expressions (1) and (2), the following equation (3) can be obtained:

$$x/t = f/R. \tag{3}$$

From equation (3) it can be appreciated that the first laser beam spot position x on the scanning plane 3 is in proportion to the second laser beam spot position t on the grid pattern 5 with a coefficient of proportionality f/R which is not dependent on the laser beam deflection angle θ in any way. Accordingly, if the grid pattern is so designed that the transparent and opaque portions are provided with a suitable predetermined period and the photoelectric signal modulated by the grid pattern thus designed is used for the timing of the light beam spot which scans the scanning plane 3, an irregular scanning speed can be corrected for.

The invention has been described with reference to the case where an fθ lens is employed as the scanning lens 2. However, if a lens with which a light beam spot position x' on the scanning plane 3 is given by the following expression (4) is used as the scanning lens, a light beam spot position t' on the grid pattern 5 can be represented by the following expression (5):

$$x' = f \cdot \tan \theta \tag{4}$$

$$t' = R \cdot \theta = R \cdot \tan^{-1}(x'/f). \tag{5}$$

Accordingly, if the period of the transparent and opaque portions of the grid pattern is so modified as to be proportional to the value t' which is obtained by increasing the value x' in expression (5) by a predetermined value, then scanning speed irregularities of the light spot on the scanning plane 3 can be corrected.

The technical concept of the invention can be effectively applied to situations in which lenses of different characteristics than the above-described f·θ lens and f·tan θ lenses are employed as the scanning lenses 2.

As is apparent from the above description, a high performance light beam scanning device in which light spot scanning speed irregularities on the scanning plane are corrected is provided according to the invention. Furthermore, according to the invention, a laser beam passed through the grid pattern is collected on the optical detector using a lens having a small diameter which eliminates the drawbacks of the conventional method which use a Fresnel lens which lowers the performance or a large bundle of glass fibers which increases the manufacturing cost. In addition, in the device of the invention, it is unnecessary that the grid pattern surface and the scanning plane be at equivalent positions. Accordingly, it is unnecessary to provide a lens between the optical detector and the grid pattern. Therefore, the device of the invention has a simple construction and low manufacturing cost.

What is claimed is:

1. A light beam scanning device comprising: light beam providing means; light beam scanning means for reflecting a first portion of light incident thereon in a scanning plane; a grid pattern curved along a circle having a center coinciding with a deflection point from said scanning means, said grid pattern having transparent portions and opaque portions arranged alternately thereon; a second portion of said light incident on said scanning means being directed to said grid pattern, said transparent and opaque portions being arranged in the direction of deflection of said second portion of light incident on said grid pattern; and detector means for producing an output signal in response to light passing through said grid pattern.

2. The light beam scanning device of claim 1 wherein said detector means comprises a condenser lens for collecting light passing through said grid pattern and an optical detector upon which light passing through said condenser lens is focused.

3. A light beam scanning device comprising: an oscillating mirror; means for directing first and second light beams onto the surface of said oscillating mirror; a focusing lens for focusing light from said light beam reflected by said oscillating mirror; a grid pattern curved along a circle having a center at a deflection point of said second light beam on said oscillating mirror and said grid pattern having transparent portions and opaque portions arranged alternately thereon, said grid pattern being positioned in the path of said second light beam after reflection from said oscillating mirror, said alternating transparent and opaque portions being arranged in the direction of deflection of said second light beam; and detector means receiving light passing through said grid pattern for producing an output signal in response to said light passing through said grid pattern.

4. The light beam scanning device of claim 3 wherein said detector means comprises a condenser lens for receiving light passing through said grid pattern and an optical detector upon which light passing through said condensor lens is focused.

5. The light beam scanning device of claim 3 wherein said first light beam is incident on said oscillating mirror on a first side thereof and said second light beam is incident on said oscillating mirror on a second side thereof opposite said first side.

6. A light beam scanning device comprising: a rotary multi-surface mirror; means for directing first and second light beams onto the surface of said rotary surface mirror; a focusing lens for focusing light from said light beam reflected by said rotary multi-surface mirror; a grid pattern curved along a circle having a center at a deflection point of said second light beam on said rotary multi-surface mirror and said grid pattern having transparent portions and opaque portions arranged alternately thereon, said grid pattern being positioned in the path of said second light after reflection from said rotary multi-surface mirror, said alternating transparent and opaque portions being arranged in the direction of deflection of said second light beam; and detector means receiving light passing through said grid pattern for producing an output signal in response to said light passing through said grid pattern.

7. The light beam scanning device of claim 6 wherein said detector means comprises a condenser lens for receiving light passing through said grid pattern and an optical detector upon which light passing through said condenser lens is focused.

* * * * *